United States Patent [19]

Avery et al.

[11] Patent Number: 5,287,384
[45] Date of Patent: Feb. 15, 1994

[54] FREQUENCY HOPPING SPREAD SPECTRUM DATA COMMUNICATIONS SYSTEM

[75] Inventors: John W. Avery, Lawrenceville; W. Burchall Cooper, Duluth; Kenneth P. Nelson, Norcross; Donald A. Jones, Alpharetta, all of Ga.

[73] Assignee: LXE Inc., Norcross, Ga.

[21] Appl. No.: 961,787

[22] Filed: Oct. 15, 1992

[51] Int. Cl.$^5$ .............................................. H04L 9/00
[52] U.S. Cl. ........................................... 375/1; 380/48
[58] Field of Search ................. 375/1; 380/48; 370/31

[56] References Cited

U.S. PATENT DOCUMENTS

| | | | |
|---|---|---|---|
| 4,575,842 | 3/1986 | Katz et al. | 370/16 |
| 4,701,911 | 10/1987 | Ulug | 370/85 |
| 4,709,365 | 11/1987 | Beale et al. | 371/11 |
| 5,095,480 | 3/1992 | Fenner | 370/94.1 |
| 5,121,382 | 6/1992 | Yang et al. | 370/31 |
| 5,123,029 | 6/1992 | Bantz et al. | 375/1 |

OTHER PUBLICATIONS

IBM Thomas J. Watson Research Center, Medium Access Control Protocol for Wireless LANs, (An Update) Mar. 9, 1992.

Primary Examiner—David C. Cain
Attorney, Agent, or Firm—Jones & Askew

[57] ABSTRACT

A frequency hopping spread spectrum wireless data communications network is disclosed. Time mark frames are transmitted by each base station at a regular cadence and each time mark frame contains all information necessary to determine the hopping sequence of channels, a sub-set of possible channels in use, and the particular channel upon which the time mark was transmitted. Receipt of the time mark resynchronizes a slot clock that is used by the wireless terminals in implementing a media access protocol with defined synchronous time slots. The base station to roaming terminal radio link is half duplex. Each base station broadcasts an end-of-message frame during a hop period that indicates that it has no more data to send during that hop. If there are no inbound messages a roaming terminal needs to send, it puts its receiver in a low power mode until the next hop time approaches. Look ahead acquisition of the hopping sequence for a nearby base station when the received signal level for the current base station drops is also disclosed.

26 Claims, 5 Drawing Sheets

FREQUENCY HOPPING SPREAD SPECTRUM DATA COMMUNICATIONS SYSTEM

TECHNICAL FIELD

The present invention relates to the field of wireless data communications networks and, in particular, is an improved low power wireless data communications system of the type commonly employing multiple base stations, that uses frequency hopping spread spectrum communications techniques and overcomes the power consumption/battery life problems that would be expected to result from use of the spread spectrum transmission system.

BACKGROUND OF THE INVENTION

Low power wireless data communications networks are used in a number of environments in which it is either impractical to run cabling for the local area network to fixed terminal sites, or where there is a need for mobile terminals that are in communications with the network. Examples of the former include rail yards and other facilities spread over a large area. In the latter category falls the most common use of such systems, normally warehouses for stocking goods for shipment or accepting parts to be used in a manufacturing process. A typical system includes multiple base stations inter-connected by cabling to a network controller that processes the data received over the network and controls the transmission of data back to remote terminals through the base stations. A typical arrangement is one in which the network controller communicate with the host via serial data links employing twisted pair cabling.

The base stations communicate via wireless radio frequency link with a plurality of remote terminals that are typically either hand held or mounted on a vehicle such as a fork lift, cart or truck. Typical terminals include keyboards and displays and some are equipped with scanning bar code readers. The networks may be used as part of any underlying system for operation of the facility in which they are used, such as assistance in taking inventory, filling orders, directing employees as to the placement of inbound products in the warehouse space and the like. Information from the remote terminals is normally entered via key pad or bar code reader. It may indicate that an assigned task has been completed, that problems have been encountered, such as the absence of sufficient goods of a particular type to fill a particular order, and so forth.

Any application that the user wishes to implement, that can be handled by the host computer, can be implemented by using the wireless data communications network. For example, the host computer can determine minimum length paths for filling particular orders and transmit to a remote terminal located on a transportation device in a warehouse the sequence in which items should be selected for filling a particular order. The systems are also very useful in environments in which just in time parts inventory systems are implemented for prioritizing movement of materials from a receiving dock to locations in a warehouse or manufacturing facility at which they are needed.

Largely by regulatory constraint in the United States of America, these systems are typically operated at a low power level since the authorized radio transmissions for this purpose are in shared portions of the electromagnetic spectrum under the regulatory scheme implemented by the United States Federal Communications Commission (FCC). Since 1985, the FCC has approved the use of low power non-license Business Radio Systems regulated under Sub-part D of Part 15 of Title 47 of the Code of Federal Regulations. Three bands are authorized for such use: 902 through 928 MHz, 2400 through 2483.5 MHz, and 5725 through 5850 MHz. Currently there are a number of constraints on the operations of such systems including a maximum radiated power of 1 watt, and a limitation on spectrum spreading techniques to direct sequencing and frequency hopping.

In view of the above cited regulatory constraint and common sense, radio frequency networks of this type need to have low radiated power. Warehouse facilities are often concentrated in the same geographic area and a high level of radiated power increases the probability of intersystem interference. For the devices that operate in the shared portions of the electromagnetic spectrum, there is also a need to minimize the radiated power to avoid interference with other devices operating on the same frequencies. Additionally, a system that is designed for relatively high power output would require high radiated power from its roaming terminals, which are typically battery operated. This situation would lead to requirements for larger, heavier batteries or shorter battery life.

Spread spectrum technology has been known for a number of years. Generally speaking, a spread spectrum radio signal is one for which the information signal is dynamically spread over a relatively wide bandwidth as opposed to systems that communicate using conventional narrow band techniques with fixed carrier frequencies. Early development of spread spectrum techniques was principally in the field of military communications because of the opportunities that a spread spectrum system gives the designer to make it resistant to attempts to jam a transmission and its resistance to interception. With respect to the latter characteristic, typically military spread spectrum systems minimize the transmission of information that is needed and useable for synchronizing the receiver to the particular spectrum spreading technique employed at the transmitter. The receiver must have knowledge of the spectrum spreading technique employed by the transmitter in order to perform a complementary operation at the receiving end so that the information can be retrieved from the received signal.

In non-military commercial applications, such as networks of the type that may embody the present invention, the resistance to interception is normally not a concern. However, the resistance to jamming manifests itself as a resistance to destructive interference from other users of the spectrum including adjacent radio frequency networks. One fundamental advantage of spread spectrum systems are that multiple systems operating in the same bandwidth look like noise sources to their neighbors.

When the use of spread spectrum for this application was first allowed by the United States Federal Communications Commission, several manufacturers entered the field with direct sequence spread spectrum systems. A direct sequence system is relatively straight forward to implement. In a direct sequence system the transmitted data stream is multiplied (via an EXCLUSIVE OR function) with a pseudo random sequence, normally referred to as a chip code. The bit rate of the pseudo random sequence exceeds the bit rate of the data signal.

The output from the EXCLUSIVE OR operation is provided to a phase shift keyed modulator and modulates a fixed frequency carrier. Since the pseudo random bit sequence has statistics that approximate noise, this has the effect of transmitting a signal which looks like broad band noise with only a relatively nominal power peak centered about the carrier frequency.

At the receiving end a correlator, which must be synchronized to the pseudo random bit sequence used at the transmitter, is used to reverse the process and reassemble the original data stream.

Part of what made direct sequence spread spectrum systems attractive is the relatively low cost and the ability to retrofit to certain aspects of existing designs. In particular, since such systems transmit on a fixed frequency carrier, only the front end processing of the digital data stream, i.e., multiplying by the chip code, need be changed. In other words prior art designs for fixed carrier frequency transmitters can continue to be used. The conventional wisdom among designers of radio frequency data transmission networks has been that the use of a frequency hopping technique for spreading the transmission spectrum would cause the systems to be complex and expensive. Furthermore, it was believed that it would be difficult to design battery operated terminals that were competitive with other conventional fixed carrier systems or direct sequence spread spectrum systems with respect to battery size/weight and battery life considerations.

While a direct sequence spread spectrum system gives some advantages as compared to narrow band FM systems, there are a number of inherent characteristics of direct sequence systems that offset the advantages gained from the spreading of the spectrum. In particular, typical applications for low power radio frequency data communications network are in relatively large facilities. Thus they typically employ multiple base stations that define different coverage cells. Since the coverage area for a 1 watt transmitter may typically be on the order of tens of thousands of square feet, many of these systems employ multiple base stations which operate in physically adjacent cells. The multiple base stations must be designed so that they do not interfere with each other.

With direct sequence techniques, the only practical approach to the design of multiple base station systems is to channelize the different base stations. Since the direct synthesis spread spectrum systems have a constant carrier frequency, the channelization defines a plurality of channels with sufficient inter-channel spectral spacing to avoid adjacent channel interference. There are thus a finite number of channels that are available for use in a given portion of the spectrum in which these devices can operate.

Channelized direct sequence spread spectrum (DSSS) systems are particularly susceptible to narrow band interference. Since, by regulatory constraint, these operate in shared portions of the spectrum (in the U.S.A.), there are a number of sources that can and sometimes do interfere with particular channels of a channelized DSSS system. This is particularly true in the 902 through 928 MHz band.

It must be kept in mind that regulatory constraint requires the low power communication device in a Business Radio System to operate without interfering with other users of this portion of the spectrum, but the converse is not true. Thus it is incumbent upon designers of radio frequency networks of this type to design the systems so that they do not interfere with other users of the spectrum. They also should minimize the susceptibility of their network to interference from existing sources, which are not constrained to pay them the same courtesy. Among the authorized uses of the 902 through 928 MHz spectrum in the United States of America are government radio location services, private operational fixed microwave systems, automatic vehicle monitoring systems, portions of the amateur radio services (ham radio), and anti-shoplifting devices used in retail establishments. Once a channelized DSSS system is installed, an authorized use of the spectrum that interferes with one or more of the channels of the DSSS system may be subsequently established in a neighboring area. This can lead to a breakdown of the operability of a system and may require the system operator to terminate the use of certain channels that the system was designed to use.

Additionally, in DSSS systems, the coverage area tends to decrease as the data rate increases, and the jamming margin decreases with data rate. As noted above, the resistance to jamming is one of the principle benefits of use of spread spectrum transmission techniques. The jamming margin is a figure of merit that relates to the resistance of the system to interference. The jamming margin is defined as $G_p-[L_{sys}+[S/N]_{out}]$ where $G_p$ is the processing gain of the system, $L_{sys}$ are the system losses, and $[S/N]_{out}$ is the output signal to noise ratio. The process gain is a figure of merit indicative of the information throughput gained by employment of spread spectrum technique in use. In particular, use of spread spectrum techniques allows a system to be designed with a higher information rate under current regulations. The processing gained in a DSSS system is approximately equal to the ratio of the channel bit rate (i.e., the chip rate) to the information bit rate. Therefore, as the information bit rate rises, the ratio of this rate to the channel bit rate decreases and the jamming margin is lowered. In a frequency hopping spread spectrum system, the processing gain is directly related to the ratio of the total channel band width to the band width occupied during each hop.

Thus, while there are advantages to be gained from DSSS systems, they are more susceptible, as compared to a frequency hopping spread spectrum system, to interference. This is particularly true in the regulatory environment within the United States of America where licensed relatively high powered radiators operate in the same portions of the spectrum. It has been found that external narrow band licensed devices in the 902 through 928 MHz band can disable operation of one or more channels of a DSSS system from as far away as seventeen (17) miles.

Also, some of the inherent benefits of the use of existing fixed carrier frequency technology in the design of DSSS radio frequency networks is offset as multiple channel/multiple base station systems are implemented. This is because movable, i.e., roaming, terminals within the system must be designed to accommodate handing off between channels as they move out of the coverage area of one base station into the coverage area of another. Therefore, the benefit of the relative simplicity of the roaming terminal receiver circuitry is offset as the need to accommodate the reception of multiple channels on the same system arises.

A frequency hopping spread spectrum system (FHSS) typically has a lower data rate than a roughly equivalent DSSS. Both DSSS and FHSS systems have significantly higher data rates than prior art narrow band FM devices. For example, previous narrow band FM products of the assignee of this application provided 9600 bit per second data rates whereas the preferred embodiment of the invention described herein achieves 64 kilobits per second. It has been recognized for some period of time that frequency synthesizer design needed for a frequency hopping spread spectrum system is more complex and consumes more power than that required in a direct sequence direct spread spectrum system. While roaming terminals must be designed to accommodate different channels, they need only be designed so that they can make the transition from cell to cell in an appropriate manner and then remain on the channel for the cell in which they are operating until they move to the next adjacent cell. A frequency hopping system is constantly and rapidly changing the transmitted and received frequencies and this leads to both a more complex system and a higher power consumption.

Furthermore, in a frequency hopping system, the complex synthesizer design must be included in the transmitters and receivers at the base stations, thus increasing complexity and cost. As noted above, prior art spread spectrum radio frequency data communication networks were uniformly direct sequence systems. It is believed that this was in large part due to the belief that the complexity and power consumption that would be required for the roaming terminals would be such that they would have unacceptably short battery lives or would require bulky and heavy batteries that would make users reluctant to use such systems. Indeed, these problems were present and the inventors of the present invention have addressed and overcome them.

The spread spectrum transmission technique is accomplished at the physical layer of the system in use. Turning for a moment to the International Standards Organization (ISO) model of a communication systems, the media access layer of the system is the layer at which a protocol defines the rules for devices gaining access to the transmission medium. In other words, at the media access layer, a protocol must be in place that determines the rules for devices gaining access to the physical transmission medium, i.e., the spread spectrum transmitter and receiver in the case of a spread spectrum radio frequency data communications network. Prior art constant frequency fixed spectrum devices have often used a media access protocol referred to as slotted ALOHA. Slotted ALOHA is slotted in that it defines multiple time slots each of finite length. The slotted ALOHA protocol includes a rule that devices can only commence transmitting at the beginning of a time slot. The slots in slotted ALOHA are of sufficient duration to allow transmission of multiple packets of information. For relatively short messages, each slot is sufficient to allow transmission of an entire message. The slotting feature avoids certain situations where multiple collisions destroy all messages. In an unslotted system, it is possible for one devive to commence transmission and encounter a collision with a transmission from a second device. If, before completion of the second message, a third device starts transmitting, the system has encountered two successive collisions that have corrupted all three messages. By constraining devices only to start transmitting at the beginning of certain time slots, and employment of appropriate rules for delays of attempts to retransmit, a similar situation for the timing of the need to send messages at three remote devices will give rise to only a single collision.

Slotted ALOHA is a selected and widely used media access protocol. However, it does require broadcasting of a slot synchronizing signal so that all remote transmitting devices can synchronize their slot clocks to each other and that of a base station.

Therefore, it is desirable to employ a protocol similar to the slotted ALOHA media access protocol because it is effective at reducing the occurrence of collisions and the algorithmic design work implementing same has been done in the prior art. However, it is a nontrivial problem to be able to broadcast the slot synchronizing signal at a sufficient rate in a data communication system in which the physical layer employs a technique of spectrum spreading.

Given the jamming margin superiority of frequency hopping spread spectrum systems as compared to direct sequence spread spectrum systems, their increased coverage area and higher resistance to multipath fading, it is desirable to be able to employ a frequency hopping spread spectrum system in a radio frequency data communications network that overcomes both the cost and power consumption problems inherent in frequency hopping systems employing battery operated transmitters and to also use a media access protocol that requires a synchronized master clock source, such as slotted ALOHA.

SUMMARY OF THE INVENTION

The present invention provides a frequency hopping spread spectrum, radio frequency data communications network that overcomes many of the disadvantages of direct sequencing spread spectrum systems and achieves battery life that is equal to that of prior art fixed frequency constant spectrum systems in which the roaming devices use batteries of the same amp-hour rating. Additionally, the present invention provides a frequency hopping spread spectrum data communication system in which the same information signal is used to synchronize both the hopping sequence between the transmitter and receiver and the time slots of the media access protocol.

Broadly stated, the present invention is a frequency hopping spread spectrum data communication system employing a time slotted media access protocol for which the same information signal that synchronizes frequency hops between transmitter and receiver also serves as a slot synchronizing signal for the media access protocol. According to another aspect of the present invention, roaming battery operated terminal devices used with the system include a low power processor that controls synchronizing of the time slot clock, controls the hopping sequence for both its receiver and transmitter, and selectively turns on and off power consuming components of the terminal when they are not needed. In particular, the power consuming sections of the radio transmitter are turned off unless and until the terminal has a message to send to the base station with which it is communicating. Since the roaming terminals typically have relatively short messages to transmit at widely spaced intervals, the duty cycle of operation of the transmitter is very small in typical applications.

Furthermore, the inventors of the present invention discovered that, upon initially experimenting with remote terminals in an FHSS system, the quiescent current drawn by the terminal's receiver circuitry was a major source of the increase in power consumption in a roaming terminal for a frequency hopping spread spectrum system. Therefore, the preferred form of the present invention uses a time slotted media access protocol that includes a half duplex transmission protocol. According to this aspect of the present invention, the base station with which a roaming terminal is communicating broadcasts an end of message sequence when it has sent its last message for a particular frequency hop. Each roaming terminal receiving the message then knows that the base station will send no more messages for the duration of the current frequency hop. The low power controller will turn off portions of the radio receiving circuitry until just before it is time for the next frequency hop to occur. Therefore, during hops for which the terminal has no inbound data to send, and for which only a short message or no message has been sent by the base station to any roaming terminal, the receiver circuitry at each roaming terminal will be turned off for the majority of the hop time. The receiver is woken up in sufficient time to allow it to prepare it for receipt of information for the next hop. The preferred form of the present invention uses HDLC coding as the message format. A time mark frame is transmitted by each base station at the beginning of each frequency hop. The time mark frame includes an address field that identifies a broadcast address for the low power modem at each remote terminal. Additionally, the time mark frame includes an identification of the channel number (i.e., the particular frequency) upon which it is broadcasting and a base station address that identifies the hopping sequence of carrier frequencies in use by the base station. This allows the receiving radio to ascertain the hopping sequence in use and become synchronized to same.

Additionally, each roaming terminal resynchronizes its media access protocol slot clock a predetermined period of time after receipt of each time mark frame, therefore synchronization of the time slots is maintained by the broadcasting of the time mark frame at the beginning of each hop. Embodiments of the present invention may be implemented so that a time mark signal is not sent at the beginning of each hop. However, it is preferred to broadcast a time mark signal at the beginning of each hop.

The architecture of the system is arranged such that the low power modem at each roaming terminal has a particular address and this address is the same for all roaming terminals. Therefore, the transmission of this address by the base station is referred to as a broadcast address since it is sent to, and intended for receipt by, all of the terminals currently in communication with the base station. The terminal processor that receives and utilizes data transmitted by base station has a unique and distinct address for each terminal in the system. Therefore, each roaming terminal device has two characteristic addresses associated therewith, one for its low power modem that maintains synchronization with the hopping sequence and the time slots for the media access protocol, and another for the terminal device. Preferably, the terminal device that receives outbound data from a base station has a vacuum fluorescent or LCD display that is used to display an indication of the received data.

According to another aspect of the present invention, multiple substantially orthogonal hopping sequences are used by a system embodying the present invention. In its preferred form, twelve full period pseudo random sequences of frequencies are employed. This is sufficient to provide an effectively unlimited coverage area since in a very large system requiring more than twelve base stations, the base stations using the same hopping sequence can be arranged so that they are physically remote enough from each other so as not to present any possibility of any interference between them should their hopping sequences become synchronized.

The preferred embodiment of the present invention employs fifty-two (52) channels, each of which is assigned a respective positive integer channel number between 1 and 52. As noted above, twelve different sequences are employed by the preferred embodiment. It is preferable to use a different sequence for each base station up to a system size at which twelve base stations are used. Then, as noted above, multiple base stations using the same sequence need only be located remotely from each other to avoid the potential of interference.

The sequences are substantially orthogonal in that they have the following characteristics. For any given sequence that transmits on its first channel at a referenced time, all of the sequences that transmit any of their channels at the reference time are selected such that the maximum number of hop times during which the two sequences will transmit on the same channel is four. In other words, for any arbitrary offset between the first members of the sequence for two different sequences, the sequences will have a maximum of four of the same channel numbers appearing at the same positions. This means that, at a maximum, 7.7% of the available information transmission time will be corrupted by interfering transmissions.

In its most preferred form the present invention includes a table of all frequencies in the band allowed by the applicable regulatory entity for this type of communication system. It then chooses a hopping sequence that is a subset of these frequencies and uses same. It is preferable to select the subset in use so that the omitted frequencies are numerically contiguous in the table of all frequencies. This allows easy selection, under firmware or configuration switch control, of a set of frequencies that avoids a portion of the spectrum in which an interfering signal is present. Even if an interfering signal from a high powered narrow band licensed transmitting source is present within the band in use, it will only interfere with a few channels of the sequence for each base station rather than completely obliterate the only channel used by a particular base station, as will be the case in a channelized direct sequencing spread spectrum system. Thus, while embodiments of the present invention may suffer a slight degradation in performance in the present of a licensed narrow band source within its frequency spectrum, it will not have the effect of disabling an entire base station, and therefore terminating coverage of a certain area of the facility in which the system is in use.

Accordingly to other aspects of the preferred embodiment, the duration of the time slots for the media access protocol is variable and information defining the length of the time slots and the number of time slots per frequency hop is transmitted in the time mark packet.

According to another preferred aspect of the present invention, the terminal processor used at each of the roaming terminals is maintained in a sleep or off mode unless it receives either an indication from the low power modem processor or an associated serial communications controller, that a base station has transmitted a message addressed to the terminal processor or it receives a request for service from an input local to the terminal, such as operation of a SEND key. Otherwise, the terminal processor is either turned off or maintained in a state of very low power consumption.

According to another aspect of the preferred embodiment, the use of a half duplex protocol allows the roaming terminals to be designed so that a single phase locked loop (PLL) frequency synthesizer may be used to both generate the transmit frequency when a roaming terminal is sending data through a base station and generate the first intermediate frequency for its receiver section when the device is in a mode to receive incoming signals from the base station.

Thus, it is an object of the present invention to provide a spread spectrum radio frequency data communication system that provides for implementation of a media access protocol using synchronous time slots.

It is a further object of the present invention to provide such a radio frequency data communication system for which battery operated roaming terminals of the system can and do experience equal battery life using a battery of the same capacity as was the case for prior art narrow band FM systems.

It is a further object of the present invention to provide a frequency hopping spread spectrum radio frequency data communication network that is less susceptible to noise than similar direct sequence systems and which exhibits gradual and graceful deterioration in performance in the presence of interfering signal sources rather than disabling interference that terminates the usability of one or more base stations on a particular channel, as is the case of the prior art DSSS devices.

It is a further object of the present invention to provide an improved roaming terminal for use in a frequency hopping spread spectrum data communications network that employs two distinct addressable units within each terminal, one of which controls system synchronization and power saving operations and the other of which accepts and utilizes outbound information from a base station and assembles and transmits outbound messages from the terminal to a base station.

It is a further object of the present invention to provide a spread spectrum radio frequency data communications system that has a superior jamming margin with respect to prior art systems.

It is still a further object of the present invention to provide a spread spectrum radio frequency data communications network that may be manufactured at a cost comparable to that of a DSSS system, has competitive data throughput capability, identical or superior battery life for battery operated roaming terminals, and takes advantage of the superior jamming margin of FHSS as contrasted to DSSS.

That the present invention accomplishes these objects and overcomes the above cited drawbacks of the prior art will be apparent to those skilled in the art from the detailed description in the preferred embodiment to follow.

DETAILED DESCRIPTION

Figure 1:
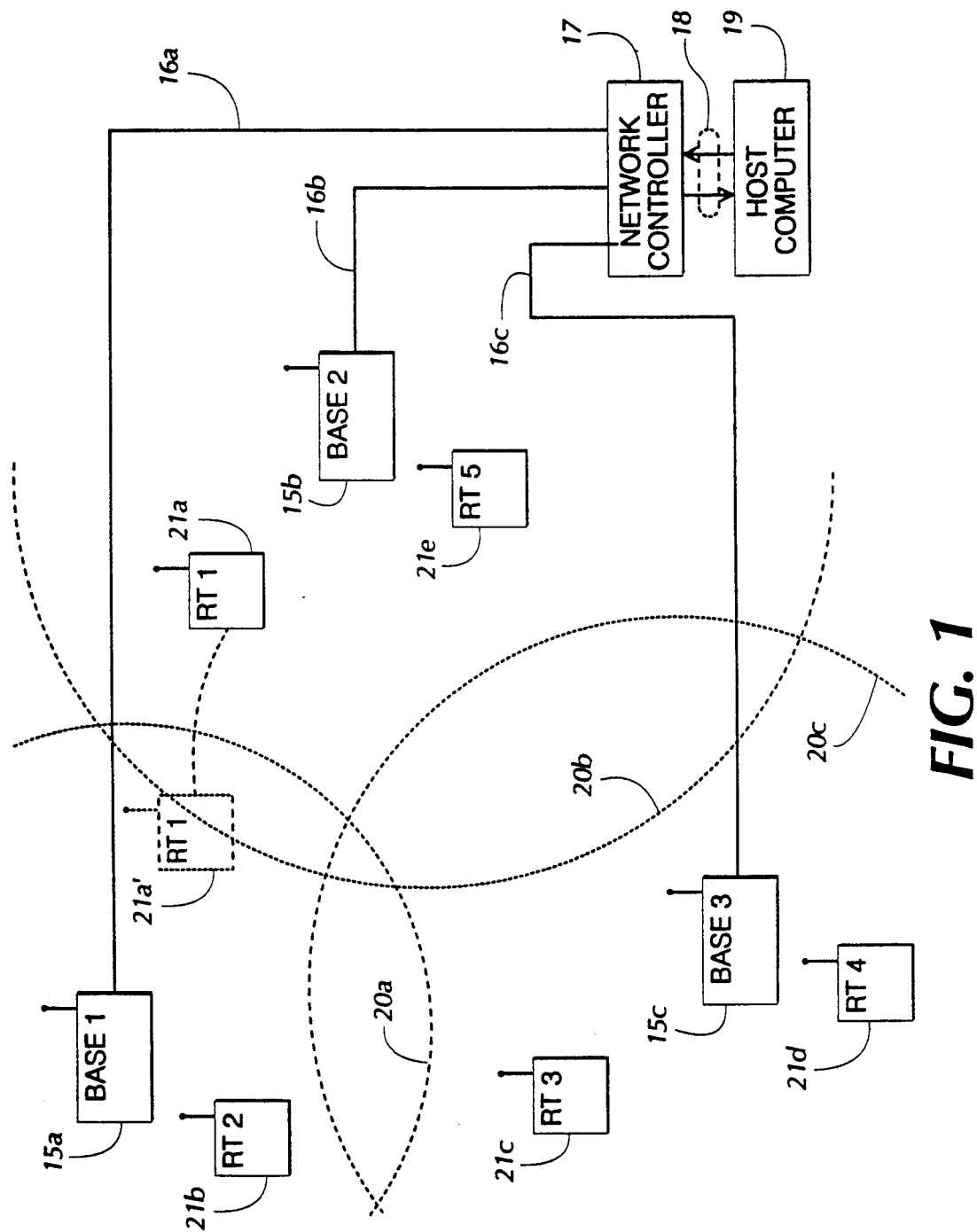
FIG. 1 is a diagrammatic plan view of an exemplary system embodying the present invention.

Turning next to the drawing figures in which like numerals indicate like parts, the preferred embodiment of the present invention will now be described.

FIG. 1 is a diagram illustrating a radio frequency data communication system embodying the present invention. In the embodiment illustrated in FIG. 1 three (3) base stations 15a, 15b, 15c cover the facility in which the system is operated. Each of base stations 15 is connected by one of respective cable links 16a, 16b, 16c to a network controller 17. Typically links 16a-16c are shielded coaxial cable, or twisted pair. The preferred embodiment of network controller 17 communicates with base stations 15 using the Ethernet protocol. Implementation of the Ethernet protocols and hardware is well known. Additionally, other local area or wide area network architectures may be employed in systems embodying the present invention. Network controller 17 communicates over link 18 with host computer 19 which is the computing device utilizing information provided over the network and transmitting information to the remote terminals of the network. Data link 18 may be implemented using any of many known terminal communication protocols. In the preferred embodiment, network controller 17 is arranged so that it makes each of the terminals 21 on the system appear, at data link 18, as if it were a dumb terminal connected to host computer 19. The preferred embodiment of network controller 17 supports the IBM SNA 3270 protocol, the IBM SNA 5250 protocol and also supports mimicking of each terminal as an Ethernet node. Thus, employing the system of the preferred embodiment with base stations 15, network controller 17, and roaming terminals 20 allows it to be directly interfaced to host computer 19 so that host computer 19 sees each of terminals 21 as if it were simply a terminal directly connected to either the computer or a standard terminal controller device.

Each of base stations 15a-15c has an associated coverage area indicated, respectively, by dashed lines 20a through 20c FIG. 1. As is shown in FIG. 1, the coverage areas overlap so that each portion of the facility in which the preferred embodiment is used will be in the coverage area of at least one base station.

A plurality of roaming terminals labeled RT1-RT5 and numbered, respectively as 21a-21e move about the facility in which the embodiment is used. As shown in FIG. 1, roaming terminals 21a and 21e are in the coverage area of base station two and are communicating with base station two. Terminal 21b is communicating with the base station 15a (i.e., base station one) and terminals 21c and 21d are communicating with base station 15c. Each of these terminals communicates with its associated base station using a half duplex protocol that employs a modified slotted ALOHA media access protocol, as described in greater detail hereinbelow.

Consider for a moment the situation when a roaming terminal such as roaming terminal RT1, indicated as 21a, moves from the coverage area of base station two into the coverage area of base station one, as it is shown in phantom at 21a' on FIG. 1. When this occurs, terminal 21a will continue to communicate with base station two until it crosses line 20b and passes out of the coverage area of base station two. This is detected by the terminal 21a as a drop in received signal strength below a predetermined level. When this occurs, the roaming terminal enters a hunt mode in which it turns on its receiver and waits on the frequency of a particular channel until it receives a time mark frame on that channel with a signal strength sufficient to indicate that it comes from a different base station than the one with which it was previously communicating. The time mark frame allows, as described in more detail hereinbelow, remote terminal 21a to synchronize its transmitter and receiver to the hopping sequence employed by base station 15a, as well as synchronize its slot clock to the slot clock defined by base station 15a. It then continues communication with the network over its radio link to base station 15a until it crosses boundary 20a into another coverage area.

Likewise, all of terminals 21 freely roam about the physical location of the preferred embodiment and are handed off among the cells defined by boundaries 20a through 20c in the manner described above.

Routing of outbound messages from host computer 19 to the appropriate base station to send it to a particular one of roaming terminals 21 is accomplished in the same manner as in the prior art. The program controlling operation of the network controller 17 notes when a message is received on a new one of base stations 15 from one of the roaming terminals and keeps track in its memory of the particular one of the base stations in which the terminal is communicating. Each of roaming terminals 21 sends a message to its new base station when it switches base stations with which it is communicating, which message allows network controller 17 to update its list of which terminals are communicating with which base stations.

As noted hereinabove, each of base stations 15 implements a spread spectrum transmission arrangement complying with Part 15 of the Rules of the Federal Communications Commissions of the United States of America. Part 15 of said regulations, as they exist as of the filing date of this application are hereby incorporated by reference. The preferred embodiment complies with the regulatory limitations for an intentionally radiating Business Radio System that is a low power communication device under Sub-part D of Part 15 of the FCC regulations. This is the only type of intentional radiator in the applicable band for which the only required equipment authorization is a Part 15 certification.

Among the regulatory limitations on frequency hopping low powered communications system in the 902 MHz band, which the preferred embodiment meets, are the following. First, the minimum number of discrete channels used must be fifty (50). The preferred embodiment employs fifty-two (52) for reasons that will be explained hereinbelow. The maximum dwell time per channel is 400 milliseconds for any twenty second window. The minimum channel spacing must be the larger of either 25 KHz or the 20 dB bandwidth of a modulated channel. The maximum 6 dB bandwidth is 500 KHz. The preferred embodiment uses a conservative design of channels with approximately a 100 KHz bandwidth. Regulations also require that the system must use each channel equally when averaged over a long period of time.

The balance of this specification describes the operation of the frequency hopping communication scheme and its synchronization with the synchronous slot media access protocol arrangement. After this description, the physical circuitry of the roaming terminals is described and its operation is described against the background of the operation of the entire system. In this way, the operation of the entire radio frequency network, as well as the detailed operation of the terminals that provide the battery savings described hereinabove, will be fully understood by those skilled in the art.

Figure 2:
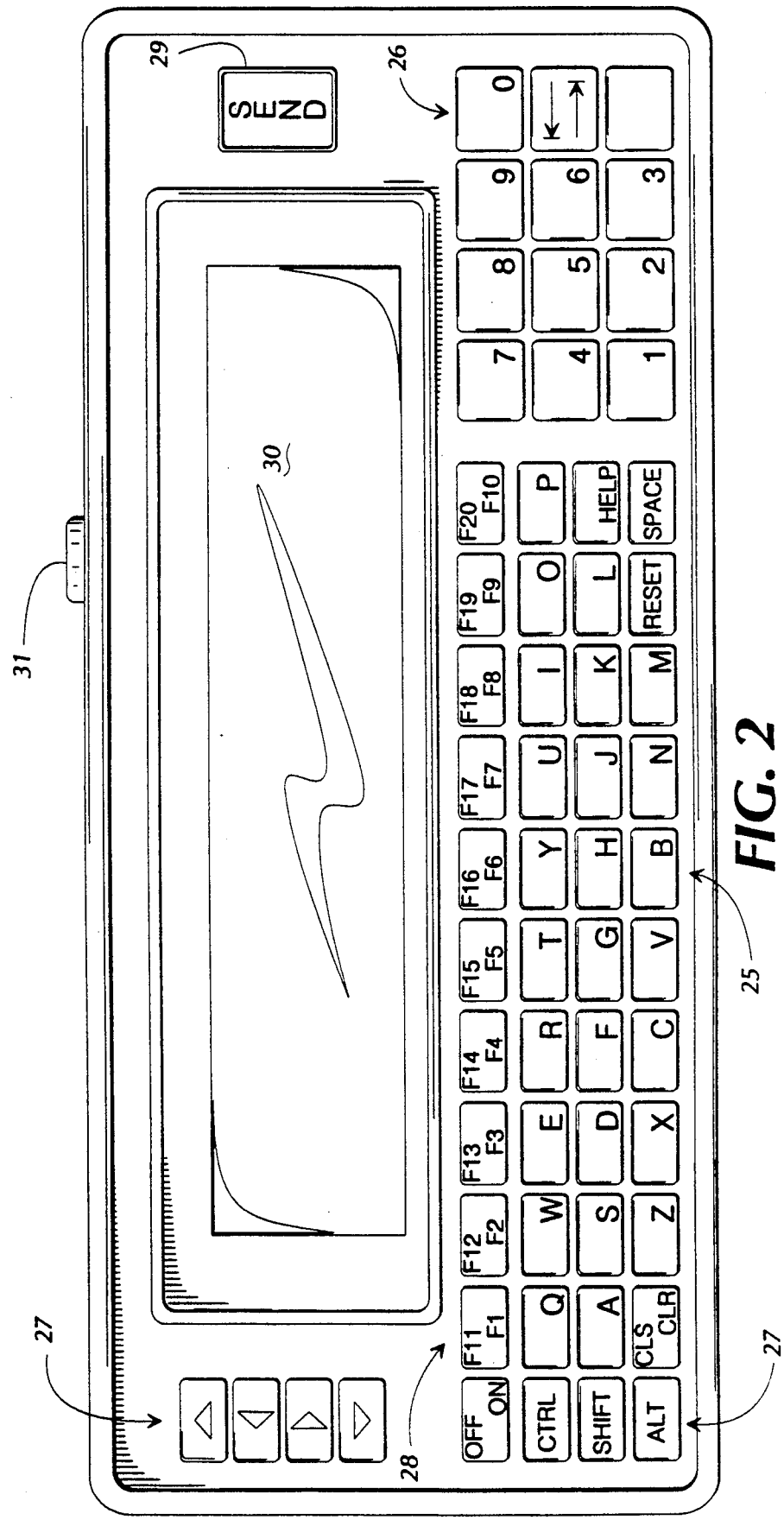
FIG. 2 is a pictorial view of one type of battery operated roaming terminal used in the preferred embodiment.

Turning for a moment to FIG. 2, an exemplary battery operated roaming terminal 21 is shown. It includes a keyboard having an alphabetic keypad section 25, a numeric keypad 26, cursor keys 27, special function keys 28 and a send key 29. A multiline dot matrix liquid crystal display (LCD) screen 30 displays both incoming data transmitted to the terminal 21 as well as displaying results of local operation of the keyboard. The device communicates with a base station through an antenna connected to receptacle 31.

In operation, the user makes appropriate key strokes on the portions 25 through 28 of the keypad. When the message the user desires to send to the host computer 19 has been assembled by an appropriate key stroke sequence, send button 29 is operated. This causes terminal 21 to send this message information to the base station with which the terminal is communicating, which in turn forwards it over its associated Ethernet link 16 to network controller 17, then on to host computer 19 (FIG. 1).

Terminal 21 is operated with a 600 mAh nickel cadmium battery (not shown). The design specification that the inventors of the present invention set for themselves was that the apparatus would operate in normal use for eight hours using a 600 mAh battery that would also provide sufficient power to operate a handheld bar code laser scanner. This design specification has been met by the apparatus described herein.

Figure 3:
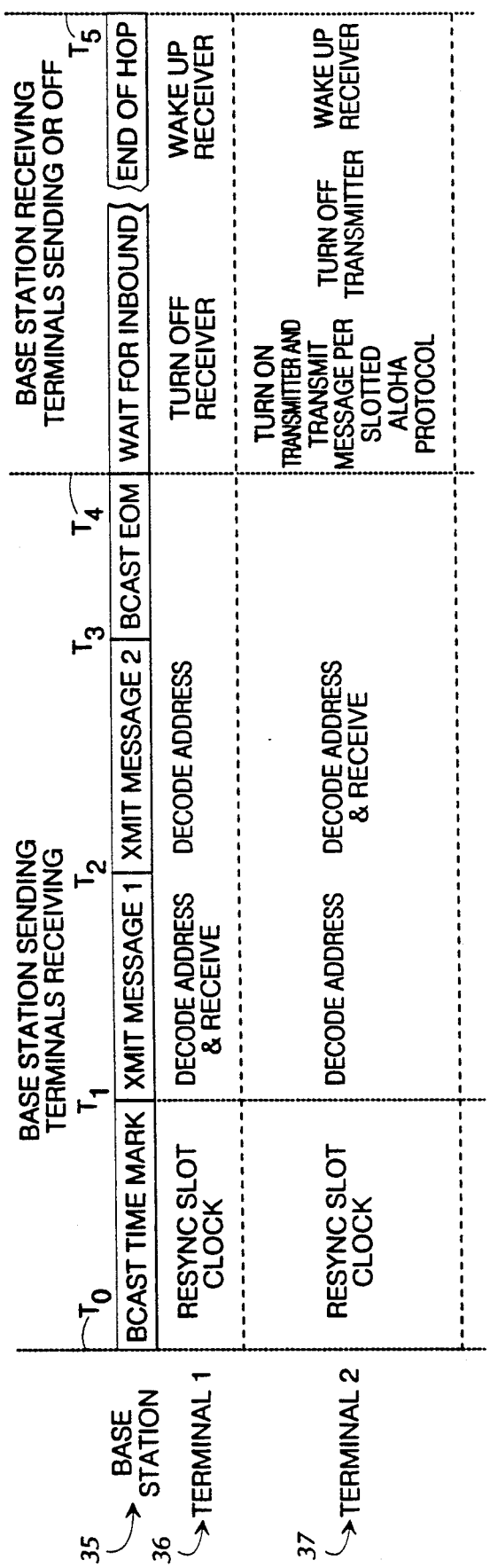
FIG. 3 is a timing diagram of typical activities of roaming terminals and a base station during one hop.

FIG. 3 is a timing diagram showing the basic communications protocol used by the preferred embodiment. FIG. 3 is not intended to be to scale or to suggest that horizontal bars of equal length represent the passage of equal amounts of time. It is provided to show the sequence of operations at a base station and the response of the terminals thereto. Several events are marked with time markers $T_0$ through $T_5$. The period of time represented in FIG. 3 is a single hop of the base station transmitter, i.e., the time it is transmitting on one of its ensemble of carrier frequencies. While regulations allow to 400 milliseconds per hop, the preferred embodiment is configurable for hop dwell times between 100 milliseconds and 400 milliseconds and the preferred embodiment defaults to an approximately 120 millisecond hop dwell time. Thus, it should be understood that FIG. 3 represents approximately 120 milliseconds of operation of the system.

Row 35 shows operations of the base station. Row 36 represents operation of a typical arbitrary terminal 1 and row 37 shows operations performed by a second terminal 2. In the example shown in FIG. 3, the base station has a message to transmit to each of the terminals illustrated. Also, as of the time of the beginning of this hop, the operator of terminal 2 has operated the send button 29 (FIG. 2) associated with his or her terminal and this particular roaming terminal is ready to send a message back to the base station with which it is communicating. At time $T_0$ the base station broadcasts a time mark frame. This is indicated as a broadcast because its modem address field (described hereinbelow) is the common modem address field for all the low powered controllers at the remote terminals on the network. Thus it is referred to as a broadcast in the same sense that broadcast distinguishes a broadcast transmission from a directed message transmission in the parlance of radio. A predetermined time after receipt of the time mark, both terminals resynchronize their locally operated slot clocks as indicated in the period between times $T_0$ and $T_1$. This allows the ALOHA time slot clocks for all remote terminals to remain synchronized with the base station.

Between times $T_1$ and $T_2$ the base station transmits message one that is intended for terminal one. As indicated on row 36, terminal 1 decodes the address and notes that it is the intended recipient of the message. It should be noted here that all sections of both terminals receiver circuitry that can be put to sleep or turned off are active commencing with time $T_0$ until noted otherwise. Once terminal 1 notes that it is the recipient of the message, it captures the message by doing a direct memory access (DMA) transfer between a serial communications controller and memory of the terminal. In the meantime, it wakes up the heretofore powered down terminal controller and generates an interrupt indicating that a received message is stored in the memory and the terminal controller should retrieve and process same. The terminal controller then reads the message from memory and takes appropriate action, such as filling display 30 (FIG. 2) or generating an audible alarm to the user.

In the meantime, as indicated on row 37, terminal 2 has decoded the address. Noting that it was not the intended recipient, it ignored the balance of the message. It continues to monitor incoming data from the base station until it receives an HDLC header that contains an address field indicating that it is the intended recipient of the message or it is an end of message frame. Recall that in the example, this is indeed the case. Transmission of message 2, intended for terminal 2, by the base station takes place between time $T_2$ and $T_3$ shown on FIG. 3. Terminal 2 decodes the address and receives the message in the same manner as terminal 1 received the previous message. Terminal 1 decodes the address and notes that it is not the intended recipient and continues to monitor the channel.

At the completion of transmission of message 2 by the base station at time $T_3$, the base station (in this example) has no more outgoing messages to send. It therefore broadcasts an end-of-message frame. As will be described in further detail in connection with FIG. 4, the end-of-message frame contains all of the information contained in a time mark frame. Indeed, it is identical except for the type field. Thus, the receipt of an end-of-message by a terminal that has just been turned on or just entered the coverage area of the base station allows the terminal to become synchronized to the hopping sequence in use. Therefore, it can be prepared for the transmission frequency of the next hop and synchronized its slot clock upon receipt of the time mark for this next hop. Therefore, the transmission of the hopping sequence synchronization information in the end-of-message frame is a way of decreasing the average time required for synchronization of a terminal upon power up or entry into a coverage area of a new base station.

The receipt of the end-of-message frame alerts all terminals communicating with the base station that the base station is through transmitting outbound messages on this particular hop. It should be noted that if the base station receives, from its internal communications circuitry, an indication, that it has a message to send to one of the roaming terminals, it will wait until the next hop before it transmits this message. Once the base station has sent an end-of-message frame, it will not attempt to transmit to a roaming terminal until it has made the next transmitter channel hop.

At time $T_4$, each of the terminals has the following information available to it. First, it knows that the base station will send no more outbound messages for the duration of the current hop. It knows when the current hop should end since it resynchronized its slot clock, which also times the hop dwell time, at time $T_0$. Each of the terminals further can determine whether or not it has a message to send to the base station. In the example shown in FIG. 3, terminal 1 has no message. Therefore, at time $T_4$, it powers down its radio receiver under a control of the low power processor associated with the terminal, and simply waits for the low power processor to indicate the end of the hop period is approaching and it is time to power the receiver back up in order to prepare itself to receive the next time mark frame that marks the beginning of the next hop time. This is the sequence performed by terminal 1 as shown on row 36 in FIG. 3.

Terminal 2 has a message to send in the example shown. Therefore, at time $T_4$ it turns on its transmitter, which has heretofore been turned off, and transmits its message to its currently associated base station per the modified slotted ALOHA media access protocol. Terminal 2 will, per the rules of the slotted ALOHA protocol, wait for the next available ALOHA time slot and commence broadcasting. The known slotted ALOHA collision detection and avoidance rules are employed together with an additional embellishment described immediately below. When terminal 2 has finished transmitting its message, it turns off its transmitter and waits for the end of the current hop time. Shortly before the end of the time, it wakes up its receiver in the same manner as terminal 1 did in order to prepare for receipt of the next time mark frame.

The additional embellishment to the slotted ALOHA collision avoidance protocol is as follows. It should be noted that in many applications, outbound messages from the base station tend to be relatively long as compared to inbound messages from the roaming terminals. This is because the outbound message often consists of large packets of data to paint an entire screen area for the roaming terminals, such as LCD display 30 shown in FIG. 2. Since it is a slotted protocol, each terminal that has a message to send will send it at the beginning of an available time slot. Under the protocol in use, the base stations have priority since it is a half duplex communication scheme for which the base station initially has control of the channel and does not relinquish same until it has broadcast an end-of-message frame. Since this is the case, the base station could theoretically exclude the remote terminal for an indefinite length of time if it had sufficient outbound traffic to send.

In the system of the preferred embodiment, the maximum number of sequential time slots that can be occupied by an outbound base station transmission is programmable and the default value is set to 20. Thus the base station can occupy almost two complete hops with outbound transmissions before it will relinquish control of the communications channel to see if any incoming messages are awaiting transmission by the roaming terminals. Note that in this sense the communications channel refers to the link between base station and remote terminales that can physically appear on one or two different frequencies while the 20 contiguous slots are occupied by a base station to roaming terminal transmissions.

If there is a lot of traffic on the network and the base station occupies a relatively large number of successive ALOHA time slots, bunching of requests to service inbound messages from the roaming terminals to the base stations can occur. It is desirable to avoid the situation in which a large number of remote terminals will immediately try to seize the channel and commence transmitting as soon as the base station has transmitted an end-of-message frame. In order to avoid this, each roaming terminal implements (preferably by firmware and a register) an up/down counter that maintains a count of the unavailable ALOHA time slots. For each ALOHA time slot that is used by the base station the counter is incremented. This takes place up to a predetermined programmable maximum, which is preferably set to the maximum number of contiguous ALOHA slots that the base station is allowed to use before relinquishing the channel, i.e., 20 in the preferred embodiment. When the counter is non-zero, it is decremented for each occurrence of an available time slot. If a counter is at zero and time slots are available, the zero count is maintained since this normally indicates that reasonable capacity for roaming terminal to base station transmissions has been available.

When a terminal modem receives a request to send a signal (RTS) from its associated terminal and this counter has a non-zero value N, the terminal controller generates a random number between 0 and N and waits that many more time slots before it attempts to seize the channel and begin transmitting. In this way, if a large amount of base station to roaming terminal traffic has occupied the link, and multiple roaming terminals have messages to send, the statistics of the collision should be improved by the fact that each terminal waits for a random number of slot times before transmitting. The probability of collision is reduced accordingly.

In the preferred embodiment, the number of slots per hop and the length of each slot is programmable within certain ranges and the preferred default values are 12 milliseconds per slot with ten slots per hop. This should be kept in mind when observing FIG. 3 for the following reasons. FIG. 3 illustrates a relatively busy hop in order to illustrate the response of the terminals when they receive messages and have messages to send. However, under many operating conditions for radio frequency data networks, there will be large amounts of idle time. Under these circumstances the base station will broadcast a combined time mark and end-of-message frame then wait for inbound messages for the balance of the duration of the hop time. The method of combining these frames is described in connection with FIG. 4, below.

Under these circumstances, roaming terminals that have no messages to send will repetitively execute the following sequence of operations. Just prior to the end of each hop time, they will wake-up the receiver section of their radio circuitry to prepare for receipt of the time mark frame. This is as shown just prior to time $T_5$ in FIG. 3. At time $T_1$ after receipt of a combined time mark and end-of-message frame, all terminals that have no inbound messages to send can turn-off their receivers while their low powered controllers simply time the duration of the hop time. So long as such terminals do not have inbound messages to send, they never have to turn on their transmitters. Thus, for periods of operation in which no messages are coming from the base stations to the roaming terminals and the terminals have nothing to send, they only need to wake-up their receivers to receive each time mark frame and then put their circuitry back to sleep until just before the next hop time.

The preferred embodiment operates at 64 kilobits per second using continuous phase frequency shift keying (CPFSK) modulation. There are 64 bits in a time mark frame and thus it takes less than a millisecond to send a time mark frame. Each terminal's receiver is woken up approximately 15 milliseconds prior to the anticipated next frequency hop since this is greater than the settling time for receiver circuitry including the phase lock loop of the receiver. Therefore, when a roaming terminal has nothing to send and the base station is not currently involved in sending outbound messages, the terminal's transmitter remains off, and its receiver need be on for only about 16 milliseconds for each 135 millisecond period that constitutes a 15 millisecond sync time between hops and 120 seconds of ALOHA slots. Thus it will be appreciated that under the described circumstances the terminal transmitters and high power terminal controllers remain off. The receiver circuitry is off for almost ninety percent (90%) of the time under these circumstances.

Thus, the half duplex communication protocol has an indeterminate time for each direction of communication within a hop time. The use of this half duplex scheme allows the battery operated roaming terminals to keep a significant amount of their circuitry powered down for the substantial majority of the operating time when there is little traffic. Since, as noted hereinabove, the receiver circuit quiescent current is ultimately what tends to absorb battery capacity in a frequency hopping spread spectrum communication system, the present system overcomes this expected deterioration in battery life performance by using the above described protocol that allows the circuitry to remain off for almost ninety percent (90%) of the time when no data is being transmitted.

A terminal that is synchronized to the appropriate frequency hopping sequence will only have to experience a delay on the order of 120 milliseconds maximum, with an average on the order of 60 milliseconds between the time a request for service of an inbound message from the terminal occurs and the time that the terminal actively attempts to get the message sent to the base station. Testing of the apparatus has indicated that this is quite acceptable.

Additionally, as described in more detail hereinbelow, the system communication protocol that under many conditions tells a roaming terminal that it has a relatively long period of time before it needs to listen for a time mark frame from its current base station allows the roaming terminals to perform a novel look ahead in anticipation of being handed off to another base station. Under these circumstances, the terminals will commence listening on another frequency during the period between the end-of-message frame and the time it must prepare for the next hop in its current sequence rather than power down its receiver.

Figure 4:
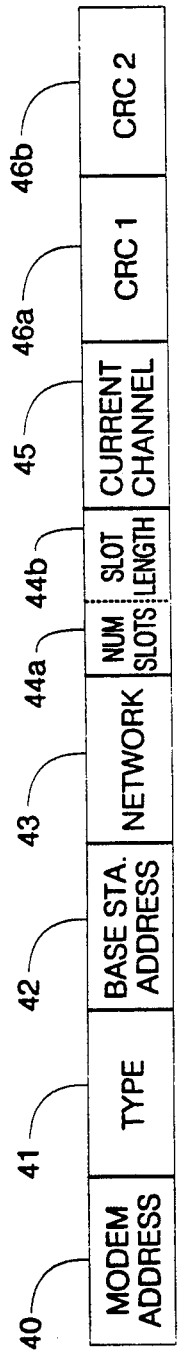
FIG. 4 is a diagram showing the significance of each byte of the time mark frame used with the preferred embodiment.

The contents of a time mark frame and an end-of-message frame are illustrated in FIG. 4. Each block in FIG. 4 represents an eight (8) bit byte and the sequence transmission of the bytes is from the left hand side to the bytes on the right hand side of the figure.

The first byte is an eight (8) bit modem address byte. Thus there are two hundred fifty-five (255) individually addressable terminals per network plus the common address used for all low power controllers that receive the time mark and end-of-message frames. Byte 41 is a TYPE byte. Each bit position may be asserted to indicate that the frame is of a particular type, and thus each bit position may independently be considered a flag to indicate whether the roaming terminals should treat the frame as being of a particular type. This arrangement allows for combined types of frames as noted hereinabove. In the preferred embodiment, the first (most significant) bit position is the flag for a time mark frame and the second bit position marks an end-of-message frame. The remaining bit positions are reserved for other message types.

Therefore, a frame for which only the most significant bit of byte 41 is set is a time mark frame only. This is normally sent when the base station has outbound messages to send in the upcoming hop time, the beginning of which is marked by the broadcasting of the time mark frame. A frame for which only the second bit of TYPE byte 41 is set is an end-of-message frame, such as that indicated as occurring between time $T_3$ and $T_4$ in FIG. 3. If both the first and second bits of byte 41 are set, the frame is a combined time mark and end-of-message frame which, as noted above, provides all the synchronizing information needed for the roaming terminals and indicates that the base station will not transmit any outbound messages during this hop time.

Base station address 42 takes values between 1 and 255 and identifies the particular base station transmitting the time mark or EOM frame, the particular one of 12 channel hopping sequences in use by the base station, and the particular subset of available physical frequencies over which the hopping sequence is spread. This is described in detail immediately following the description of the remainder of the time mark frame.

Network address 43 is a one (1) byte indicator with a value between 0 and 255 that indicates the particular network for which the base station is a member. This allows multiple networks to be operated in the same coverage area and terminals to communicate with only selected ones of such networks when desired.

ALOHA slot specification byte 44 is divided into two 4 byte nibbles, shown as 44a and 44b in FIG. 4. The first nibble takes values between 0 and 15 and designates the number of slots per hop. The physical number of slots per hop has a minimum of five (5), and thus the range of actual number of slots per hop indicated by nibble 44a is an integer in the range [5, 20].

Nibble 44b indicates the length of the slot in milliseconds according to the formula (slot length * 3)+6. This yields a slot time in the range of [6, 51] milliseconds, in three (3) millisecond increments.

Current channel byte 45 indicates the channel upon which this time mark or end-of-message frame has been transmitted. The time mark and end-of-message frames end with a two (2) byte cyclic redundancy check value in bytes 46a and 46b.

It is the inclusion of the base station address byte 42 that is the fundamental information entity and the time mark slot that allows synchronization of the hopping sequences and graceful hand off in embodiments of the present invention. Inclusion of channel number 45 is beneficial, although logically redundant. The inventors of the present invention have discovered that under certain circumstances, aliased signals of a time mark frame can appear on a channel that is physically distinct from the one upon which the frame was transmitted. When this occurs, a remote terminal attempting to achieve synchronization with the hopping sequence of a base station can mistakenly identify the channel upon which the base station broadcasts the time mark frame because it assumes it is broadcast on the same channel to which the roaming terminal is tuned for that hop time. When this occurs, the terminal will miscalculate the next frequency upon which the base station will transmit and, under most circumstances, will not receive the next time mark frame broadcast by the base station. The terminal will then enter the hunt mode and have to resync itself. The transmission of the current channel number in the time mark and EOM frames inform the terminals of the channel number upon which the signal was broadcast so that the next hopping frequency may be properly calculated even if the frame is received via an aliased signal.

As noted hereinabove, the information in the base station address is key to synchronizing the hopping sequences between the base stations and the roaming terminals. The embedding of the sequencing information in the base station address will now be described.

As noted hereinabove, a plurality of substantially orthogonal sequences is chosen so that there is a minimum of overlap of use of the same carrier frequencies for adjacent base stations having different hopping sequences. Starting first with the regulatory constraints applicable to the 902 MHz band, 400 KHz channel spacing is allowed in the United States of America. This provides 65 distinct channels in which the frequency hopping spread spectrum transmitters can operate. All channels used by a frequency hopping spread spectrum transmission system must, on average, be used an equal amount of the time. While it is certainly possible to construct multiple large sequence tables in memory, it should be recalled that one aspect of the preferred embodiment is to use a low power relatively slow CMOS processor as the low power processor at each roaming terminal. In the preferred embodiment a type 80C51 CMOS one chip microcomputer, which has very limited addressable memory space is employed. Thus it is highly desirable to have the ability to generate certain of the necessary tables using integer arithmetic. The inventors of the present invention have adopted the following arrangement to avoid adjacent base station interference and comply with the regulations applicable in the United States.

Since all channels must be used equally, a sequence of channels used by the spread spectrum communications system must be a full sequence, i.e., it must use each channel once during each cycle of the hopping sequence. A multiplicative generator in the form $$Z_{i+1} = (XZ_i) \text{ MOD } (Y)$$

is a multiplicative pseudo random number generator that generates a full sequence if Y is a prime number and X is a positive integer. For Y a prime number, this multiplicative generator generates a full sequence of pseudo random numbers in the range [1 to (Y−1)]. Note that each value of $Z_N$ represents a logical channel number for the sequence in use. Thus it is the channel numbers that are rarely duplicated in the substantially orthogonal sequence. Since regulations require at least 50 distinct channels to be used, the inventors selected Y=53, the first prime number greater than 50. The seed (i.e., the value of $Z_0$) was arbitrarily chosen to be one and then correlation analysis on the sequences generated for various values of the multiplier X were examined for substantially orthogonal sequences.

Twelve (12) of these were identified as substantially orthogonal in that, for any offset of the starting number of the sequence, two of the sequences would at most have these same sequence number in four (4) positions. Another way of looking at this is to envision one (1) sequence in a fifty-two (52) element register, and envision loading another of the sequences into a second fifty-two (52) element shift register and then performing fifty-one (51) circular shifts on the second register. The result of these shift would be that, under all possible states of the second shift register, only four (4) of the same channel numbers would appear at the same shift register position. The identified values of X that yield these twelve (12) selected sequences are 2, 3, 5, 8, 12, 14, 18, 19, 20, 21, 22, and 26.

Since the preferred embodiment uses 400 KHz spacing over the 26 MHz of available spectrum in this band, sixty-five (65) physical channels are available.

It is considered advantageous for larger system to be able to employ all sixty-five (65) available physical channels. Additionally, even for smaller systems, operation in the presence of narrow band high power interference from a licensed user of the same portion of the spectrum can lead to a situation where it is desirable to notch out certain portion of the band since the sequencing scheme described above requires the use of only fifty-two (52) of the available sixty-five (65) channels. Thus, the physical arrangement of the memory and operation of the low powered processor in the roaming terminals is as follows.

The numerical values for each of the sixty-five (65) frequency values spaced at 400 KHz in the 902 through 928 MHz band are physically arranged in a table in memory and assigned sequential numbers one (1) through sixty-five (65). An offset value is defined for five (5) sub-tables of fifty-two (52) members each, each of which represents a contiguous segment of the physical sixty-five (65) member table, considered in circular fashion. In other words, when stepping through the table of physical channels past the number sixty-five (65), the sequence continues "... 63, 64, 65, 1, 2, 3, ...". The offsets used are spaced thirteen (13) numbers apart and thus the members of each sub-table may be ascertained from the following rule.

| Sub-table | Offset | Physical Channels in Sequence of (52) Logical Channels, 1-52 |
|---|---|---|
| 1 | 0 | Start at beginning of table (1-52) |
| 2 | 13 | Add 13 to random number (14-65) |
| 3 | 26 | Add 26 to random number MOD 65 (27-13) |
| 4 | 39 | Add 39 to random number MOD 65 (40-26) |
| 5 | 52 | Add 52 to random number MOD 65 (53-39) |

Naturally, the embodiments of the present invention that use only a fixed fifty-two (52) member sub-set of the sixty-five (65) possible physical channels are possible, as well as those using a wider channel separation. For example, fifty-two (52) individual channels can be spread over the 26 MHz bandwidth of this particular portion of the spectrum with a 500 KHz channel spacing.

Returning to the preferred embodiment for a moment, it will be seen that this arrangement allows contiguous portions of the band to be eliminated from use simply by selecting the appropriate sub-table.

All of this discussion was generated by the fact that the base address byte 42 shown in FIG. 4 encodes both the sub-table described above and the particular one of the sequences in use by the base station. The sequences are sequentially numbered one (1) through twelve (12) according to the particular one of the values of X used in the multiplicative generator described hereinabove.

The base station address of byte 42 (FIG. 4) takes on values 1 to 255. Since there are five (5) defined sub-tables of the sixty-five (65) distinct frequency channels used by the preferred embodiment, and twelve (12) different sequences of the fifty-two (52) logical channel numbers used, there are (5*12)=60 different combinations of sub-tables and sequences that may be used by the base stations. The preferred embodiment allows 255 distinct base station addresses that allow the base stations to be uniquely identified when needed, and allows roaming terminals to seek communication with a particular base station. The particular one of the sixty (60) combinations of frequency sub-table and channel number sequences in use by the base station is derived from the base station address according to the following formula. For base station addresses BASEADD in the range [1, 255] the sequence and sub-table in use is defined by:

Sequence Number=((BASEADD−1 MOD 12)+1

Sub-Table Number=(((BASEADD−1)/12) MOD 5)+1 wherein the division by 12 in the second formula is an integer division operation which yields the integer part of the quotient. Thus, it will be appreciated that, for base addresses 1 through 60, unique combinations of sub-tables and sequences are generated. Commencing with base address 61, the combinations start to repeat themselves with a modulus of 60 until one arrives at base address 255 which uses sub-table 2 and sequence 3.

From this it will appreciated that, for any base station address, the portion of the permanent table of 65 possible frequencies having 400 KHz spacing, that is used is defined by using the multiplicative generator identified above for the particular multiplier associated with each of the twelve (12) sequences in use. The sub-table number minus 1, multiplied by 13, gives an offset that should be added, modulo 65, to the $Z_i$ channel number to provide the physical channel number.

The effect of this arrangement is to hop equally about 80% of the available spectrum for any of the given sub-tables. This arrangement further allows elimination of the use of 20% of the available spectrum in this band simply by changing the base addresses for the base stations in use. This allows 5.2 MHz of bandwidth to be notched out simply by changing the definition of the base address. This is more than adequate to handle most circumstances in which an operator of the network encounters inband interference from a narrow band high powered licensed transmitter that shares this portion of the spectrum. It can also eliminate problems of the network interfering with a nearby licensed transmitter.

Figure 5:
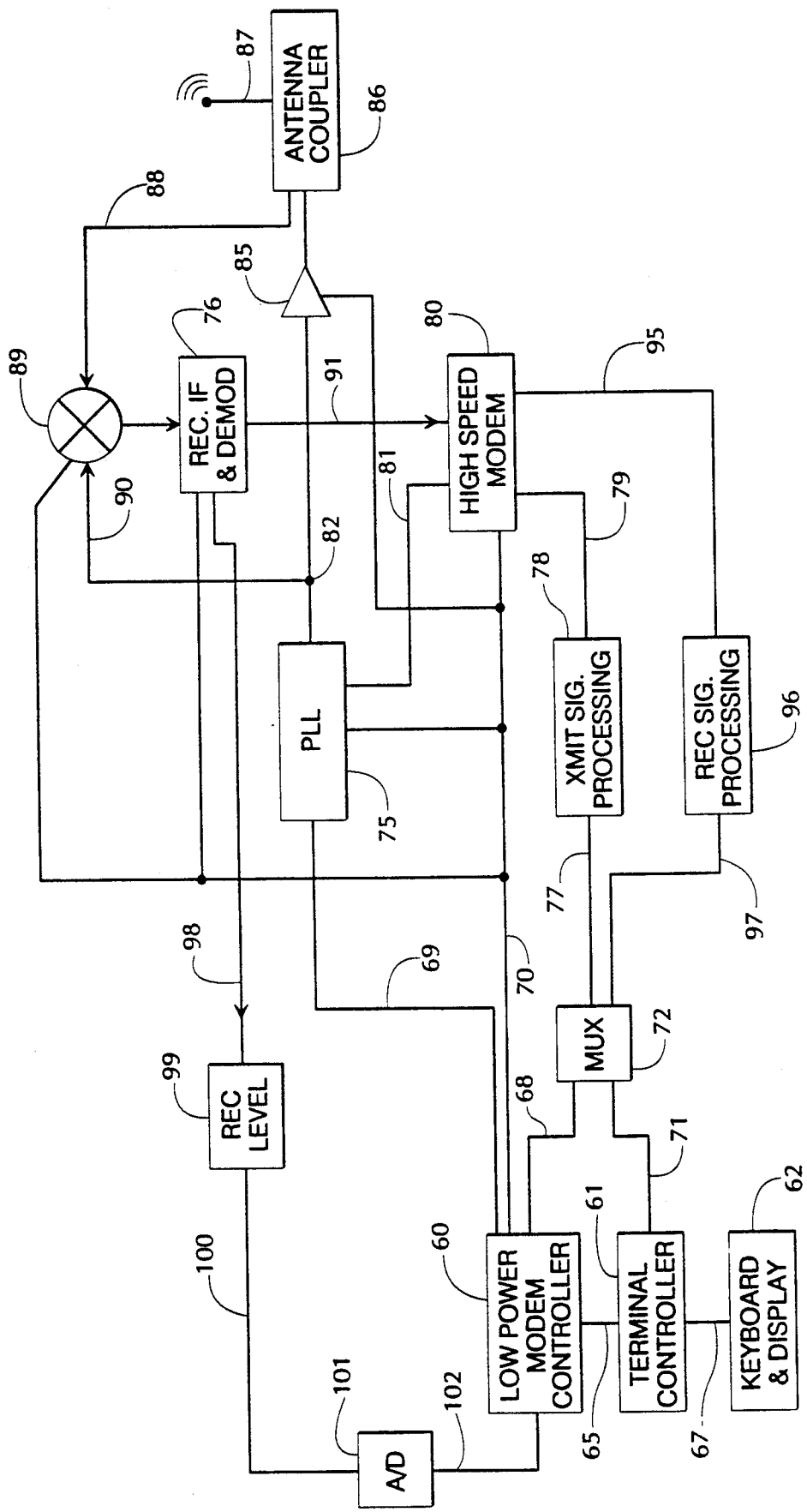
FIG. 5 is a block diagram of the preferred embodiment of a roaming terminal used in the system of the present invention.

FIG. 5 is a block diagram of a roaming terminal used in the preferred embodiment. First, it should be noted that same is entirely battery powered, though neither the battery nor the connections thereto are shown in the drawing for the sake of avoiding unneeded clutter. It should be understood that the connections shown on FIG. 5 are for purposes of representing the block diagram. They physically may be embodied as single conductor, multi-conductor, or bidirectional signal paths as appropriate. Proper implementation of each of such lines will be apparent to those skilled in the art in view of the description of the functional relationship of the block that follows.

A low power modem controller controls many of the important functional aspects of the present invention. In the preferred embodiment the low power modem controller includes a type 80C51 low power CMOS microcontroller and a type 85C30 serial communications controller and associated memory. The type 85C30 SCC is currently manufactured by Zilog, Inc. of Cupertino, Calif. and is second sourced by other manufacturers. A terminal controller 61 controls communication between the input and output devices of the terminal. Terminal controller 61 likewise includes a serial communications controller and associated memory. In the preferred embodiment, the input and output devices are the keyboard and a display, as indicated at block 62 in FIG. 5. It should be understood that other input devices can be used including bar code readers which provide output that is logically identical to a sequence of key strokes.

There is a communication link between controllers 60 and 61 that is represented by line 65. It passes back and forth between terminal controller 61 and the input/output device 62 over signal paths represented by line 67.

There are three main types of outputs from low power controller 60. These are the data and clock paths represented by line 68, the PLL control paths represented by line 69 and the power up/down controls represented by line 70. Similar data and clock paths to and from terminal controller 61 are represented by line 71 in FIG. 5. Paths 68 and 71 are multiplexed, using a multiplexer 72 that is controller by low power controller 60. It should be noted that some of the function of multiplexer 72 is just to isolate terminal controller 61 from some of the noise that may be present on clock and data lines in the apparatus while low power controller 60 will always monitor these lines.

Path 69 to phase locked loop 75 controls the quiescent frequency of the PLL voltage controlled oscillator (VCO) and thereby tunes the received frequency of the receiver section of the terminal's radio and also provides the transmit carrier. Since the communication protocol in use by this apparatus is a half duplex one, the signal PLL 75 can be, and is, used to generate both the transmit signal and to beat down the received signal by an appropriate amount for the first intermediate frequency of receiver IF and demodulator circuitry 76.

The outbound signals from multiplexer 72 appear on line 77 as the input to the transmit signal processing block 78. This includes a selectively operable scrambler implementing the polynomial $1+X^4+X^9$. This is used to avoid a contiguous sequence of transmitted ones or zeros that would cause the transmitted signal to have a constant frequency, shifted up or down from the carrier center frequency, that could cause the base station receiver to lose the bit time clocking information.

The output from the signal processing circuitry appears on line 79 as the transmit side input to a high speed base band modem 80. This signal is appropriately filtered and a smooth version thereof appears on line 81 that goes to a control input for the VCO of phase locked loop 75. Therefore, when the device is transmitting, the output of the phase locked loop, that appears at point 82, is a continuous phase frequency shift keyed output signal. This signal is amplified by amplifier 85 and passes on through antenna coupler 86 out to antenna 87 where it is transmitted. Antenna coupler 86 is an active diode switching coupler of a type well-known to those skilled in the art. Its switching function is under the control of low power modem controller 60.

When coupler 86 is switched for a receive function, a received signal from antenna 87 appears on line 88 that is one input to a mixer 89. Mixer 89 mixes a signal on line 88 with the signal from point 82 that is provided over line 90. When the terminal is in its receive mode, low power control 60 controls the divide ratio in the frequency synthesizer of phase locked loop 75 via signals provided over path 69. Therefore, the frequency of the signal that appears at point 82 appropriately beats down the signal on line 88 to the proper frequency for the first IF stage of the receiver IF and demodulator circuitry 76. The output from this circuit appears on line 91 as the receive side input to high speed modem 80. The frequency shift keyed signals are demodulated in modem 80 and a base band bit string appears on line 95 as the input to the receive signal processing circuitry 96. In the receive signal processing circuitry, the signal is squared up, the appropriate reference level is determined, and the bit clock is recovered for use with the synchronous HDLC protocol employed by the downstream digital devices. The received data and received data clock signals are provided to multiplexer 72 over paths 97.

An analog signal indicative of the received signal level on the channel to which PLL 75 tunes the receiver appears on line 98 as the input to a filtering and integrating received level detector circuit 99. The output of circuit 99 appears on line 100 as a filtered analog signal proportional to the received signal level of the carrier from the channel to which the receiver is tuned. This is provided to an analog to digital converter circuit 101 that communicates with low power controller 60 over line 102 so that controller 60 can ascertain the received signal level for the channel to which the terminal is tuned.

Several novel and beneficial features are derived from the operation of the system using the architecture illustrated in FIG. 5. First, it will be appreciated that power control line 70 is provided to control the powering up and down of mixer 89, portions of the receive IF and demodulator circuit 76, phase locked loop 75, and transmit power amplifier 85. It should be understood that separate signals are available for selectively powering up and down these circuits, and that only some may be powered up at any time the controller indicates or they all may be powered down, as is often the case in operation.

In the preferred embodiment, the selective powering up and down of circuits is accomplished in several ways, all of which will be familiar to those skilled in the art. When the physical circuitry embodying the components includes integrated circuits with enable inputs that may be used to place the IC in a lower power dissipation mode, such inputs are used as part of the powering up and down circuitry. In other cases, transistor switches between either the positive power supply lead or the ground lead of a device are used to selectively turn it on and off. Additionally, as noted hereinabove, terminal controller 61 includes a microprocessor that has a sleep mode. These types of devices are well known to those skilled in the art and they put themselves to sleep via a software command and are reawakened by either an internally generated timed interrupt or an external interrupt signal.

As described hereinabove, low power controller 60 is monitoring the received signal on a line 97 for a time mark frame that contains all the data described in the frequency hopping sequence in use by the base station with which the device is communicating. When the controller 60 decodes the sequence in the current channel, as described hereinabove, it has complete knowledge of the hopping sequence used by that particular base station. It provides an appropriate control over lines 69 to control the frequency of phase locked loop 75 for both transmission and receiving portions of each hop time. Thus, the controller 60 monitors the received digital signal on line 97 for a time mark frame and provides a frequency control signal out over line 69 to tuning apparatus, which includes phase locked loop 75 and mixer 89 in response to the information contained in the time mark frame. Additionally, controller 60 monitors the same signal for the end of message frames and selectively powers down portions of the radio receiver connected to line 70 for the remainder of the hop time as illustrated in FIG. 3 and described hereinabove.

Received level detect circuit 99, and the digitization of same that is accomplished by A to D converter 101, is used to provide a look ahead operational feature for handing off the terminal between base stations. It should be noted that in the preferred embodiment the handing off of the terminal between base stations is, strictly speaking, a misnomer. In the preferred embodiment of the present invention, it is the roaming terminal that makes the decision when to change base stations with which it is communicating.

The look ahead feature operates as follows. The low power controller 60 monitors the received signal level. When this level falls below a predetermined threshold, controller 60 will cause the terminal to enter into a hunt mode for at least a portion of the remainder of the hop time interval that follows receipt of an end of message signal. Referring for a moment to FIG. 3, the terminal will encounter the described circumstances and enter a hunt mode between times T4 and T5 shown in FIG. 3 when the terminal has no message to send and it detects a sufficient drop in the received signal level. The terminal enters the hunt mode by switching to another frequency and listening for either a time mark signal or an end of message signal on that other frequency. Since there is no synchronization between the slot clocks of the individual base stations, there is a reasonably high probability that the apparatus will detect either a time mark frame or an end of message frame (or one that has both type flags set) during the interval it is in the hunt mode. This is particularly true during low traffic intervals for which the remainder of the hop time following the end of message frame may be 80-90% of the hop time.

When the controller finds a time mark or end of message frame on the new channel, it checks the received level signal strength to determine if this appears to be coming from a base station that is closer. If the received signal level is considered adequate, the apparatus will then switch to the new hopping sequence for the new base station on the next hop time. Thus, it changes the base station with which it is communicating.

The terminal controller 61 will send an appropriately formatted message to the new base station identifying itself, which message causes the base station to notify network controller 17 (FIG. 1) that the new base station is now the device communicating with this particular terminal.

Once again, it should be noted that this switching to the new sequence on the next hop time is made possible by the fact that the time mark and end of message frames contain complete unambiguous information as to the hopping sequence in use in the particular channel upon which the frame was transmitted so that the controller can become immediately synchronized to the hopping sequence. When making this transition, the terminal is only disabled from communication for a fraction of a hop time since it will make the switch at some point during a hop time from the old sequence and will then wait, tuned to the appropriate frequency, for the next time mark frame from the new sequence. Receipt of the time mark synchronizes the terminal's slot clock, and it starts timing the hop interval. At this point it is synchronized to the hopping sequence and slot clock of the new base station, and is ready to immediately commence communication therewith.

It may also be desirable to construct embodiments in the present invention for which controller 60 must receive multiple successive frames at signal levels below the predetermined threshold before it decides that the terminal has actually been moved out of an appropriate range for the base station with which it is communicating. It is also possible to keep track of the sense in which signal strength is changing. If it continues to monotonically decrease over several hop times, it may be appropriate to immediately switch to a new and stronger signal. If the signal level continues to hover about a low, but still acceptable, level it may be simpler to maintain communication with the current base station until the signal falls below a second predetermined level that indicates a communication will be lost shortly if a change is not made.

Figure 6:
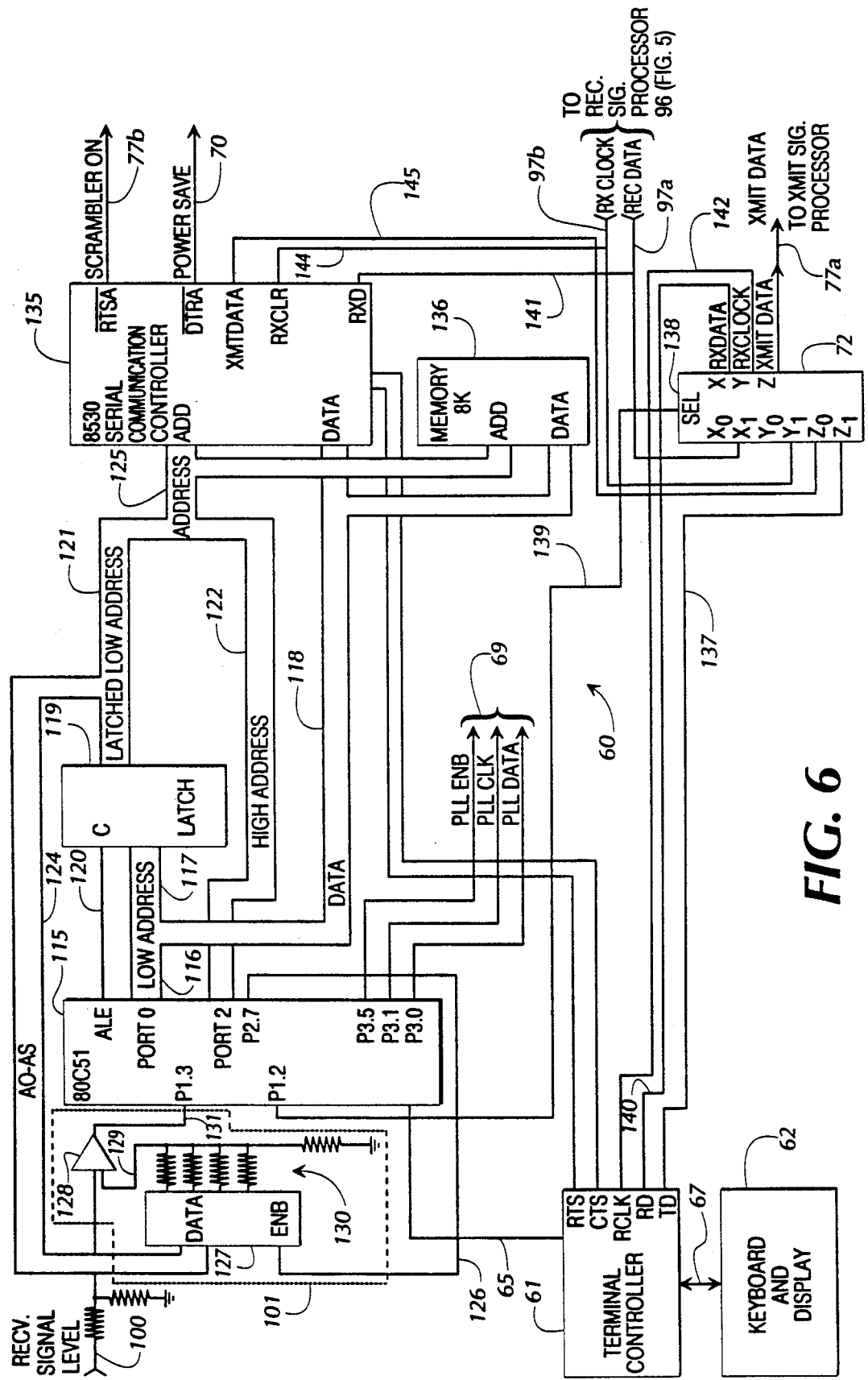
FIG. 6 is a partially schematic, partially blocked, diagram of the low power modem controller for the preferred embodiment of a roaming terminal.

Turning next to FIG. 6 a more detailed partially block, partially schematic, diagram of the low power modem controller 60 is shown. All of the circuitry of FIG. 6 forms a portion of low power controller 60 represented on FIG. 5 except for terminal controller 61 and I/O devices 62, multiplexer 72 and A to D converter 101. The balance of the physical devices are part of the modem controller, the function of which was described in connection with FIG. 5. The modem controller is constructed about a type 80C51 one chip microcomputer 115. This is a commonly used microcontroller device and the characteristics depends on its four I/O ports are well-known to those skilled in the art and well documented. In a conventional manner, the eight port zero lines are brought out on a bus 116 which forms both the low address bus 117 and the data bus 118 for the controller. Low address bus 117 provides the inputs to latch 119 which latches the low order address bits on a strobe of an address latch enable (ALE) signal on line 120. This provides eight latched low address lines 121 when addressing of an external device is taking place.

Seven lines of port 2 from processor 115 form the high address bus 122. This is combined with the latched low address bus 121 to form the system address bus 125. The highest order high address line from pin P2.7 is brought out on line 126 and provided to the enable input of a register 127 that forms a portion of the analog-to-digital converter 101.

Six of the latched low address lines are carried on a tap 124 as inputs to register 127. Register 127 forms a portion of a successive approximation converter, the memory register of which is a register within processor 115. It operates as follows. The received signal level input on line 100 is provided as an input to a comparator 128. The reference voltage is provided, in a conventional fashion, on line 129 as the output of a weighted resistor network indicated at 130 in FIG. 6. This apparatus performs a conventional successive approximation to determine the value of the analog signal present on line 100. The output of the comparator is provided on line 131 as an input to pin 1.3 of port 1 of microcontroller 115.

When making a conversion, the comparator determines whether the signal is above or below a predetermined level that is determined by the signals on tap 124 and the weighting of resistors 130. The binary output of this result that appears on line 131 and is stored as the first bit of the comparison process. Next, the signals on tap 124 set the reference voltage on line 129 to a level that divides the previously halved portion of the range in half again, and determines what the next bit should be. This is done successively until the limit of resolution of the number of bits has been reached and the conversion has thus been completed. Even though successive approximation consumes a fair number of program steps, it is easy to do same in the architecture of the controller shown in FIG. 6 in that the serial communications controller 135 handles many of the data formatting, accumulation, and transmission tasks, leaving the microcontroller 115 with sufficient blocks of available time. Thus, it is less expensive to implement a successive approximation as shown rather than use more expensive analog-to-digital conversion devices.

Parallel data transfers between microcontroller 115 and serial communications controller 135 take place using address bus 125 and data bus 118 in a conventional manner. Control lines for controlling the read and write cycles of the devices shown in FIG. 6 are not shown in the drawing, as all connections are conventional and showing same would unnecessarily clutter the drawing.

An 8K memory device 136 is the external random access memory for the controller. It is likewise addressed using address bus 125 and data bus 118 in a conventional manner. As is known to those skilled in the art, serial communications controller 135 can be configured to accept incoming messages on one of its two channels, strip off the HDLC overhead bits and transfer message data, via the controller, to a connected memory device such as memory 136. Since serial communications controller 135 is always monitoring received data via lines 141, it examines all traffic coming into the terminal. Any message intended specifically for the address of the low power controller is transferred into memory 136.

When low power controller 60 detects a header indicating that an incoming message is intended for terminal controller 61, it wakes up terminal controller 61 via an interrupt on line 65, switches the logic level on line 139 to connect lines 140 and 142 to terminal controller 61 and allow the serial communications controller associated with controller 61 to likewise capture the incoming message data. In terminal controller 61, a more powerful microprocessor is used and the controller takes advantage of the built-in direct memory access (DMA) transfer capability of a serial communications controller. Thus, DMA transfer of incoming message data between SCC and associated memory within terminal controller 61 is employed in the preferred embodiment.

Lines 97a and 97b are, respectively, the received data line and the received data clock line from the received signal processing circuitry represented by block 96 in FIG. 5. These are provided, respectively, to the $X_1$ and $Y_1$ inputs to multiplexer 72. Input $Z_1$ of multiplexer 72 carries the signal on the transmit data line 137 from terminal controller 61. The select input 138 of multiplexer 72 is controlled by the signal on line 139 from pin 2 of port 1 of microcontroller 115. Therefore, when line 139 is in its logical 1 condition, the received data signal on line 97a is routed through multiplexer 72 to the received data line 140 that is input to terminal controller 61. Note that line 141 to serial communications controller 135 is always connected to line 97a and thus the serial controller 135 of the low power modem controller always monitors the received data signal. Similarly, the received clock signal on line 97b is routed to the received clock line 142 of terminal controller 61 under certain circumstances. Similarly, line 144 always carries this signal to serial controller 135.

The transmit data output line 77a has its signal switched between transmit data line 145 from serial controller 135 and transmit data line 137 from terminal controller 61. Thus either low power modem control 60 or terminal controller 61 can transmit data to a base station over line 77a.

It should further be noted that the function of multiplexer 72, with respect to the signals on lines 97a, 97b is simply to selectively block or gate the signals from lines 140 and 142 since serial communications controller 135 is always monitoring the state of these lines.

Phase locked loop control line 69 shown in FIG. 5 is physically manifested as three separately lines shown collectively at bracket 69 in FIG. 6. These are a PLL enable line, a PLL clock line, and a PLL data line that are provided from port 3 of microcontroller 115. Those skilled in the art will recognize that certain lines of port 3 of a microcontroller in the 8051 family are configurable as a serial port, and this configuration is employed in the preferred embodiment. The serial port data clock signal on pin 1 of port 3 provides the PLL clock signal. The phase locked loop is enabled or disabled by pin 5 of port 3 and a one (1) bit data signal for controlling the division ratio of the phase detector is provided at pin 0, port 3.

The power save control line 70 is brought out from the channel A DTR output of SCC 135. This control pin is used to selectively power up and power down the portions of the circuitry described hereinabove in connection with FIG. 5. The on/off control for the scrambler which forms a part of the transmit signal process in circuitry 78 (FIG. 5) is implemented through control of the channel A request to send (RTS) pin from SCC 135. It is known to those skilled in the art how to write control words into SCC 135 to control these serial port pins so that they may be forced to the state desired by microcontroller 115.

From the foregoing description of the preferred embodiment, it will be appreciated that the present invention indeed meets the objects recited above and overcomes the drawbacks of the prior art noted hereinabove. Some of the implementations aspects of the preferred embodiments described herein are specific to the particular choice of protocols, such as the choice of a modified slotted ALOHA media access protocol and HDLC format for synchronous data transfer. However, these details should not obfuscate the general applicability of the scope of the present invention to being embodied by systems that employ other protocols and details of implementation. In view of the foregoing description of the preferred embodiment in its intended environment, other embodiments of the present invention will suggest themselves skilled in the art. Therefore, the scope of the present invention is to be limited only by the claims below and equivalents thereof.

We claim:

1. In a radio frequency data communication system of the type comprising at least one base station and a plurality of terminals, said system employing a media access protocol of the type that defines a plurality of discrete time slots generated locally at each of said plurality of terminals and at said base station in response to a slot synchronizing signal broadcast from said base station, the improvement comprising in combination therewith:

a frequency hopping spread spectrum transmitter at said base station for transmitting an information signal for a predetermined hop period on each of a predetermined plurality of carrier frequencies in a predetermined sequence;

time mark generating means at said base station for generating a time mark frame that is provided as at least a part of said information signal for at least some of said plurality of carrier frequencies, said time mark frame including information for synchronizing a receiver at each of said plurality of terminals to receive said information signal on each of said predetermined plurality of carrier frequencies in said predetermined sequence;

terminal slot synchronizing means at each of said plurality of terminals for defining the start of a next one of said discrete time slots a predetermined period of time after receipt of each said time mark frame;

whereby said time mark frame serves as said slot synchronizing signal and synchronizes both said discrete time slots and said predetermined sequence of said plurality of carrier frequencies between said base station and said plurality of terminals.

2. A radio frequency data communication system as recited in claim 1 wherein:

said time mark generating means provides said time mark frame as at least a part of said information signal for each of said plurality of carrier frequencies.

3. A radio frequency data communication system as recited in claim 1 wherein:

said predetermined sequence is a first predetermined sequence selected from a predetermined plurality of sets of predetermined sequences of said plurality of carrier frequencies;

each said time mark frame includes a base address field that identifies said first predetermined sequence as the particular one of said predetermined plurality of sets of predetermined sequences of said plurality of carrier frequencies upon which said base station is transmitting; and each said receiver at each said terminal receiving said time mark frame receives said information signal on each of said predetermined plurality of carrier frequencies in said first predetermined sequence in response to said base address field.

4. A radio frequency data communication system as recited in claim 1 wherein:

a number of said discrete time slots that occur for each said predetermined hop period is selectively variable;

each said time mark frame includes a number of slots field that identifies said number of said discrete time slots; and each said terminal slot synchronizing means at each of said plurality of terminals includes slot counting and timing means for locally generating said discrete time slots in response to said number of slots field.

5. A radio frequency data communication system as recited in claim 1 wherein:

a duration of each of said discrete time slots is selectively variable;

each said time mark frame includes a slot duration field that identifies said duration of each of said discrete time slots; and each said terminal slot synchronizing means at each of said plurality of terminals includes slot counting and timing means for locally generating said discrete time slots in response to said slot duration field.

6. A radio frequency data communication system as recited in claim 1 wherein:

said time mark generating means causes each said time mark frame to include a channel number field that identifies a particular one of said plurality of carrier frequencies upon which said time mark frame is being transmitted.

7. In a radio frequency data communication system of the type comprising at least a plurality of base stations and a plurality of terminals, said system employing a media access protocol of the type that defines a plurality of discrete time slots generated locally at each of said plurality of terminals and at each of said plurality of base stations in response to a slot synchronizing signal broadcast from each said base station, the improvement comprising in combination therewith:

a frequency hopping spread spectrum transmitter at each said base station for transmitting an information signal for a predetermined hop period on each of a predetermined plurality of channels, in a particular predetermined sequence selected from a set of predetermined sequences, each of said predetermined plurality of channels being associated on a one-to-one basis with one of a plurality of distinct channel numbers and corresponding on a one-to-one basis with one of a predetermined plurality of distinct carrier frequencies, time mark generating means at each said base station for generating a time mark frame that is provided as at least a part of said information signal for at least some of said plurality of channels, said time mark frame including information for synchronizing a receiver at each of said plurality of terminals to receive said information signal on each of said predetermined plurality of channels in said particular predetermined sequence;

terminal slot synchronizing means at each of said plurality of terminals for defining the start of a next one of said discrete time slots a predetermined period of time after receipt of each said time mark frame;

whereby said time mark frame serves as said slot synchronizing signal and synchronizes both said discrete time slots and said particular predetermined sequence of said plurality of channels between each said base station and said plurality of terminals.

8. A radio frequency data communication system as recited in claim 7 wherein:

each member of said set of predetermined sequences is substantially orthogonal to each of the remaining members of said set of predetermined sequences.

9. A radio frequency data communication system as recited in claim 8 wherein:

each member of said set of predetermined sequences is a sequence, $Z_1, Z_2, Z_3 \ldots Z_{Y-1}$, for which said channel number is defined by a multiplicative generator of the form $$Z_{i+1} = (XZ_i) \text{ MOD } (Y)$$

where Y is a positive prime integer and X is a positive integer.

10. A radio frequency data communication system as recited in claim 9 wherein X is chosen from the set consisting of [2,3,5,8,12,14,18,19,20,21,22,26].

11. A radio frequency data communication system as recited in claim 7 wherein:

said time mark generating means at each of said plurality of base stations provides said time mark frame as at least a part of said information signal for each of said plurality of channels.

12. A radio frequency data communication system as recited in claim 7 wherein:

each said frequency hopping spread spectrum transmitter at each said base station transmits using a member of said set of predetermined sequences that is different than the member of said set of predetermined sequences used by a nearest other one of said plurality of base stations.

13. A radio frequency data communication system as recited in claim 7 wherein: at each of said plurality of base stations, each said time mark frame includes a base address field that identifies a particular member of said set of predetermined sequences upon which said base station is transmitting; and each said receiver at each said terminal receiving said time mark frame receives said information signal on each channel in a sequence that is said particular member of said set of predetermined sequences in response to said base address field.

14. A radio frequency data communication system as recited in claim 7 wherein:

a number of said discrete time slots that occur for each said predetermined hop period is selectively variable;

each said time mark frame includes a number of slots field that identifies said number of said discrete time slots; and each said terminal slot synchronizing means at each of said plurality of terminals includes slot counting and timing means for locally generating said discrete time slots in response to said number of slots field.

15. A radio frequency data communication system as recited in claim 7 wherein:

a duration of each of said discrete time slots is selectively variable;

each said time mark frame includes a slot duration field that identifies said duration of each of said discrete time slots; and each said terminal slot synchronizing means at each of said plurality of terminals includes slot counting and timing means for locally generating said discrete time slots in response to said slot duration field.

16. A radio frequency data communication system as recited in claim 7 wherein:

said time mark generating means causes each said time mark frame to include a channel number field that identifies a particular one of said channels upon which said time mark frame is being transmitted.

17. In a radio frequency data communication system of the type comprising at least a plurality of base stations and a plurality of terminals, said system employing a media access protocol of the type that defines a plurality of discrete time slots generated locally at each of said plurality of terminals and at each of said plurality of base stations in response to a slot synchronizing signal broadcast from each said base station, the improvement comprising in combination therewith:

a frequency hopping spread spectrum transmitter at each said base station for transmitting an information signal for a predetermined hop period on each of a predetermined plurality of channels, in a particular predetermined sequence selected from a set of predetermined sequences, each of said predetermined plurality of channels being associated on a one-to-one basis with one of a plurality of distinct channel numbers and corresponding on a one-to-one basis with one of a predetermined plurality of distinct carrier frequencies, each member of said set of predetermined sequences being a sequence, $Z_1, Z_2, Z_3 \ldots Z_{Y-1}$, for which said channel number is defined by a multiplicative generator of the form $$Z_{i+1} = (XZ_i) \text{ MOD } (Y)$$

where Y is a positive prime integer and X is positive integer chosen from the set consisting of [2,3,5,8,12,14,18,19,20,21,22,26].

time mark generating means at each said base station for generating a time mark frame that is provided as at least a part of said information signal for at least some of said plurality of channels, said time mark frame including information for synchronizing a receiver at each of said plurality of terminals to receive said information signal on each of said predetermined plurality of channels in said particular predetermined sequence;

terminal slot synchronizing means at each of said plurality of terminals for defining the start of a next one of said discrete time slots a predetermined period of time after receipt of each said time mark frame;

whereby said time mark frame serves as said slot synchronizing signal and synchronizes both said discrete time slots and said particular predetermined sequence of said plurality of channels between each said base station and said plurality of terminals.

18. A radio frequency data communication system as recited in claim 17 wherein:

said time mark generating means at each of said plurality of base stations provides said time mark frame as at least a part of said information signal for each of said plurality of channels.

19. A radio frequency data communication system as recited in claim 17 wherein:

each said frequency hopping spread spectrum transmitter at each said base station transmits using a member of said set of predetermined sequences that is different than the member of said set of predetermined sequences used by a nearest other one of said plurality of base stations.

20. A radio frequency data communication system as recited in claim 17 wherein: at each of said plurality of base stations, each said time mark frame includes a base address field that identifies a particular member of said set of predetermined sequences upon which said base station is transmitting; and each said receiver at each said terminal receiving said time mark frame receives said information signal on each channel in a sequence that is said particular member of said set of predetermined sequences in response to said base address field.

21. A radio frequency data communication system as recited in claim 17 wherein:

a number of said discrete time slots that occur for each said predetermined hop period is selectively variable;

each said time mark frame includes a number of slots field that identifies said number of said discrete time slots; and each said terminal slot synchronizing means at each of said plurality of terminals includes slot counting and timing means for locally generating said discrete time slots in response to said number of slots field.

22. A radio frequency data communication system as recited in claim 17 wherein:

a duration of each of said discrete time slots is selectively variable;

each said time mark frame includes a slot duration field that identifies said duration of each of said discrete time slots; and each said terminal slot synchronizing means at each of said plurality of terminals includes slot counting and timing means for locally generating said discrete time slots in response to said slot duration field.

23. A radio frequency data communication system as recited in claim 17 wherein:

said time mark generating means causes each said time mark frame to include a channel number field that identifies a particular one of said channels upon which said time mark frame is being transmitted.

24. A terminal for use in communicating with at least one base station in a wireless radio frequency data transmission network comprising in combination:

a radio receiver;
a radio transmitter;
tuning means connected to said radio receiver for selectively tuning its receive frequency response to a frequency control signal and connected to said radio transmitter for selectively changing its transmit frequency in response to said frequency control signal;

a modulator having a digital input, said modulator being connected to said radio transmitter to selectively vary said transmit frequency in response to a digital transmit data signal at said digital input;

a demodulator having a digital output, said demodulator being connected to said radio receiver to provide a received digital signal on said digital output in response to variations in said receive frequency;

a terminal controller connected to a source of terminal input data and said modulator for providing a terminal request to send signal and said digital transmit data signal in response to operation of said source of terminal input data;

a low power controller connected to said demodulator, said terminal controller, and to said radio transmitter for monitoring data packets from said digital output for a time mark frame addressed to said low power controller and for providing said frequency control signal to said tuning means in response to information in said time mark frame, and for powering up at least a portion of said radio transmitter in response to said terminal request to send signal, to maintain said portion of said radio transmitter in a powered up condition while said terminal controller is providing said digital transmit data signal, and to otherwise power down said portion of said radio transmitter.

25. A terminal for use in communicating with at least one base station in a wireless radio frequency data transmission network comprising in combination:

a radio receiver;

tuning means connected to said radio receiver for selectively tuning its receive frequency in response to a frequency control signal to provide a received signal;

a demodulator having a digital output, said demodulator being connected to said radio receiver and said tuning means to provide a received digital signal on said digital output in response to variations in said received signal;

a low power controller connected to said demodulator and to said radio receiver for monitoring said received digital signal from said digital output for a time mark signal and for providing said frequency control signal to said tuning means in response to information in said time mark signal, for timing a predetermined hop time interval commencing with its detection of said time mark signal, for monitoring said received digital signal from said digital output for an end of message signal;

for powering down at least a portion of said radio receiver for at least a portion of the remainder of said hop time interval in response to receipt of said end of message signal.

26. A terminal for use in communicating with a plurality of base stations in a wireless radio frequency data transmission network comprising in combination:

a radio receiver;

tuning means connected to said radio receiver for selectively tuning its receive frequency in response to a frequency control signal to provide a received signal;

level detection means connected to said tuning means for providing a a level signal indicative of the power of said received signal;

a demodulator having a digital output, said demodulator being connected to said radio receiver and said tuning means to provide a received digital signal on said digital output in response to variations in said received signal;

a low power controller connected to said demodulator, said radio receiver, and said level detection means for monitoring said received digital signal from said digital output for a time mark signal and for providing said frequency control signal to said tuning means in response to information in said time mark signal, for timing a predetermined hop time interval commencing with its detection of said time mark signal, for monitoring said received digital signal from said digital output for an end of message signal;

for powering down at least a portion of said radio receiver for at least a portion of the remainder of said hop time interval in response to receipt of said end of message signal when said level signal is above a predetermined threshold value, and alternately for changing said frequency control signal and monitoring said received digital signal on a different channel for an occurrence of said time mark signal for at least said portion of said remainder of said hop time interval in response to receipt of said end of message signal when said level signal is below a predetermined threshold value.

* * * * *